(12) United States Patent
Matlack et al.

(10) Patent No.: US 7,699,206 B2
(45) Date of Patent: Apr. 20, 2010

(54) GIMBALLING ROLLER DEVICE FOR FRICTION STIR WELDING APPARATUS AND METHOD

(75) Inventors: Michael P. Matlack, St. Charles, MO (US); Kurt A. Burton, Wildwood, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 12/098,531

(22) Filed: Apr. 7, 2008

(65) Prior Publication Data

US 2009/0250505 A1 Oct. 8, 2009

(51) Int. Cl.
*B23K 20/12* (2006.01)
(52) U.S. Cl. ..................... 228/2.1; 228/112.1
(58) Field of Classification Search .............. 228/2.1, 228/44.3, 112.1; 156/73.5; 219/243–259
See application file for complete search history.

(56) References Cited

U.S. PATENT DOCUMENTS

| 5,833,171 | A | * | 11/1998 | Harris | ............ 242/615.1 |
|---|---|---|---|---|---|
| 6,302,315 | B1 | | 1/2001 | Thompson | |
| 6,554,175 | B1 | | 4/2003 | Thompson | |
| 6,742,696 | B2 | | 6/2004 | Thompson | |
| 2002/0027155 | A1 | * | 3/2002 | Okamura et al. | ......... 228/112.1 |
| 2005/0092817 | A1 | * | 5/2005 | Baumann et al. | ............ 228/212 |
| 2006/0124691 | A1 | | 6/2006 | Wood et al. | |
| 2006/0163316 | A1 | | 7/2006 | Burton et al. | |
| 2007/0034671 | A1 | | 2/2007 | Burton et al. | |
| 2007/0152015 | A1 | | 7/2007 | Burton et al. | |
| 2007/0266536 | A1 | | 11/2007 | Burton et al. | |
| 2008/0084018 | A1 | * | 4/2008 | Baumann et al. | ............ 269/271 |

FOREIGN PATENT DOCUMENTS

JP 63312060 A * 12/1988

* cited by examiner

*Primary Examiner*—Jessica L. Ward
*Assistant Examiner*—Kevin E Yoon
(74) *Attorney, Agent, or Firm*—NovaTech IP Law

(57) ABSTRACT

A friction stir welding (FSW) apparatus has an FSW tool adapted for joining work pieces supportable against a backing anvil. The FSW apparatus comprises a pair of clamping rollers maintained in substantially perpendicular relationship to the backing anvil as the FSW tool moves along the tool path. A roller pivot joint of the FSW apparatus maintains a cylindrical roller outer surface of each clamping roller in substantially parallel relationship to the top sides of the work pieces. The roller pivot joint may include a gimballing roller bearing to which the clamping roller is mounted. The roller bearing is universally movable in a variety of directions to maintain the perpendicular relationship of the clamping rollers relative to the backing anvil.

7 Claims, 5 Drawing Sheets

GIMBALLING ROLLER DEVICE FOR FRICTION STIR WELDING APPARATUS AND METHOD

CROSS-REFERENCE TO RELATED APPLICATIONS

The present application is related to commonly-owned U.S. Patent Publication No. 2007/0266536 entitled TOOLING HEAD MOUNTED STRUCTURAL POSITIONING SYSTEMS AND METHODS filed on May 17, 2006, the entire contents of which is incorporated by reference herein.

STATEMENT RE: FEDERALLY SPONSORED RESEARCH/DEVELOPMENT (Not applicable)

FIELD

The present disclosure relates generally to welding apparatus and, more particularly, to a gimballing roller device for a friction stir welding apparatus.

BACKGROUND

Friction stir welding (FSW) is a well known method for joining metallic parts that may be formed of a variety of different alloys. In the FSW process, a FSW pin tool is plunged into the work pieces to be joined until a tool shoulder of the FSW pin is disposed above or is flush with the top surface of the work pieces. A pin portion of the FSW pin is forced into the thicknesses of the pieces to be joined. The FSW pin is driven along a tool path such that friction generated between the FSW pin and the work pieces results in plasticization of an annular region surrounding the pin portion. The resulting joint provides a high-strength, lightweight bond that is producible at relatively low cost and with a reduced process cycle time as compared to other fastening systems.

During the FSW process, it is necessary to prevent movement of the work pieces as the FSW pin is moved along the tool path. In this regard, a fixture assembly may be provided for anchoring the work pieces. The fixture assembly may include a backing anvil against which the work pieces are clamped in the region of the tool path. Due to the extremely high forces required to plunge the FSW pin into the metallic work pieces as well as the high forces required to drive the FSW pin along the tool path, it is necessary that the fixture assembly for securing the work pieces is robust and highly-resistant to movement as any shifting in the position of the work pieces can cause the FSW pin to deviate from the desired tool path. A deviation in the tool path can compromise the integrity of the joint between the work pieces and may require reworking of the joint or scrapping of the work pieces altogether.

Difficulties in securing the work pieces are compounded in cases where the joint between the work pieces has a complex curvature. In such cases, a multi-axis joining machine such as a five-axis FSW apparatus may be employed in order to allow the FSW pin to accurately follow the complex curvature of the desired joint. In addition to regulating the direction of movement of the FSW pin, the five-axis FSW apparatus must also regulate the rotational speed and travel speed of the FSW pin.

Importantly, in order to produce a high quality joint, the work pieces must be clamped against the backing anvil at least in the region of the FSW pin as it moves along the tool path. Furthermore, it is desirable to clamp the abutting surfaces of the work pieces in substantially uniform contact with one another in the region of the FSW pin as it is driven along the tool path. Ideally, uniform pressure is applied across a width of the abutting surfaces of the work pieces to maintain the work pieces in uniform contact with each other and in uniform contact against the backing anvil. Such pressure may be applied by clamping rollers that may be disposed on opposing sides (e.g., on the leading and/or trailing sides) of the FSW pin as it moves along the tool path.

For complex curvature joints, it is necessary that the clamping roller is maintained in a perpendicular orientation of the clamping roller with the backing anvil such that uniform pressure is applied across the width of the abutting surfaces of the work pieces. Failing to apply uniform pressure across the joint may result in a phenomenon known as "backside coining" wherein the finished joint includes raised surface features such as bumps or other surface defects on the backside of the joint (i.e., the side opposite the FSW pin). Removal of these surface features may be necessary and may be facilitated by grinding or sanding of the surfaces after the FSW joining process is complete.

As may be appreciated, the need to rework the joined pieces in order to eliminate backside coining increases manufacturing cost and production time. For certain aerodynamic components, the surface finish tolerances may be relatively small such that even minor defects in the backside surface require reworking to reduce or eliminate the surface features. For example, an engine inlet for an aircraft jet engine may require a surface finish that allows for a substantially laminar flow of air into the jet engine. In this example, surface bumps as small as 0.020 inches must be removed to prevent disruption of the laminar flow.

As can be seen, there exists a need in the art for a system and method for joining parts by FSW wherein a uniform clamping pressure is applied across the work pieces to be joined as the FSW pin moves along the tool path. More specifically, there exists a need in the art for a system and method for joining parts by FSW which provides uniform clamping pressure of the work pieces against the backing anvil in order to prevent the occurrence of backside coining. Even further, there exists a need in the art for a system and method for joining parts by FSW wherein the uniform clamping pressure can be applied as the FSW pin moves along a complexly curved tool path.

BRIEF SUMMARY

The present disclosure specifically addresses the aforementioned needs associated with maintaining work pieces in position during a friction stir welding (FSW) operation by providing a FSW apparatus and joining method which is specifically adapted to continuously and autonomously re-orient the direction of clamping pressure applied to work pieces against a backing anvil in conformance with changes in the curvature of the joint between the work pieces.

More specifically, the FSW apparatus is adapted to maintain clamping rollers in a perpendicular orientation relative to the backing anvil in order to facilitate contact between work pieces to be joined as well as to facilitate uniform contact of the work pieces against the backing anvil in the region of the joint as the FSW pin moves along the curved tool path.

In accordance with various embodiments disclosed herein, the FSW apparatus comprises at least one and, more preferably, a pair of the clamping rollers which are preferably disposed on leading and trailing sides (i.e., opposing sides) of the FSW pin. The clamping rollers are configured to be maintained in substantially perpendicular relationship to the backing anvil as the FSW pin moves along the tool path.

The pair of clamping rollers are preferably operatively connected to a respective roller bracket disposed on opposing sides of the FSW pin. The roller brackets may include a roller bearing which is mateable to a cavity formed in the clamping roller. The roller bearing may have a spherical outer surface which is complementary to a spherical cavity formed in the clamping roller in order to allow universal movement therebetween.

The FSW apparatus may include a pair of roller packs to which the roller brackets may be mounted. The roller packs may be adapted to apply a biasing force to the clamping roller in order to bias the work pieces against the backing anvil during the FSW operation. In one embodiment, the FSW apparatus may be configured such that air actuators provide a downward or biasing force to the roller packs in order to supply the necessary clamping pressure between the work pieces and the backing anvil.

BRIEF DESCRIPTION OF THE DRAWINGS

These and other features will become more apparent upon reference to the drawings wherein like numbers refer to like parts throughout and wherein.

DETAILED DESCRIPTION

Figure 1:
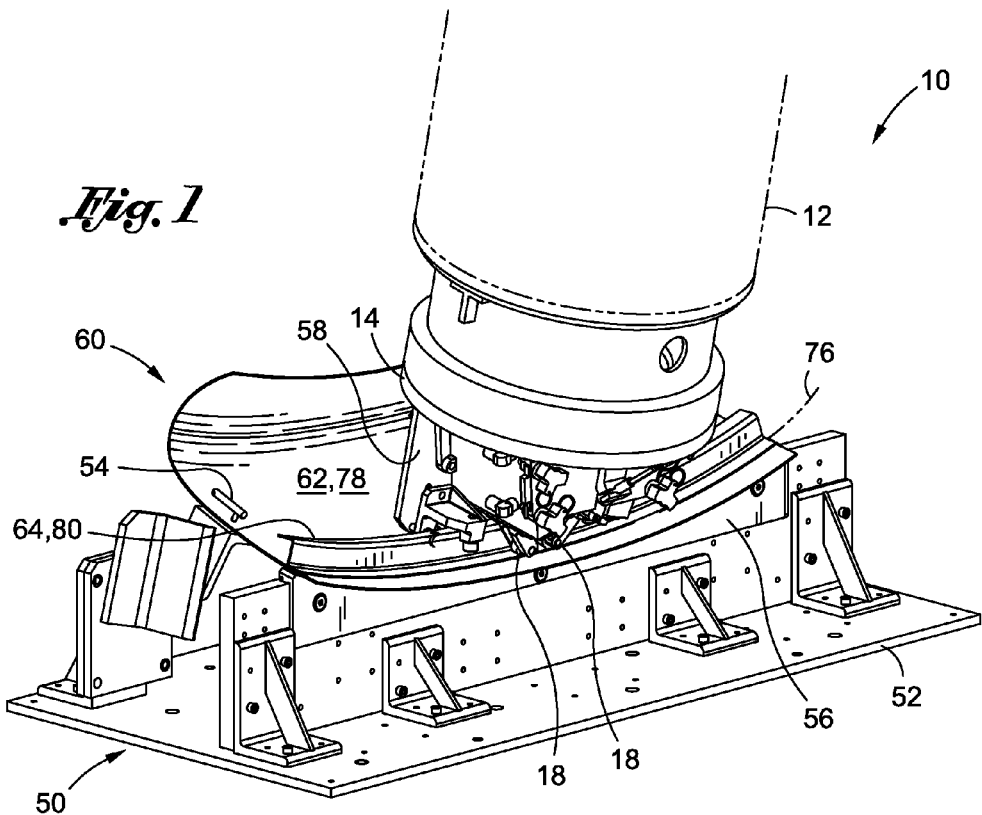
FIG. 1 is a perspective view of a friction stir welding (FSW) apparatus in one embodiment and illustrating the mounting of a work piece assembly on a fixture assembly.

Referring now to the drawings wherein the showings are for purposes of illustrating preferred embodiments and not for purposes of limiting the same, shown in FIGS. 1-8 is an exemplary illustration of a friction stir welding (FSW) apparatus 10 and joining method 100 adapted for eliminating angularity between a clamping roller 30 of the FSW apparatus 10 and a backing anvil 56 of a fixture assembly 50. The fixture assembly 50 may be adapted to support work pieces to be joined such as first and second work pieces 78, 80 illustrated in the FIGS. 1-4. Although the figures illustrate the first and second work pieces 78, 80 being joined at an FSW joint 82, any number of work pieces may be joined.

The configuration of the FSW apparatus 10 and clamping roller 30 advantageously allows for the application of a uniform clamping pressure distribution on the work pieces against the backing anvil 56 as a FSW tool 36 of the FSW apparatus 10 moves along a tool path 76 to form the FSW joint 82. The tool path 76 may be complexly curved such that the direction of clamping pressure may be continuously and/or autonomously re-oriented to conform to changes in the curvature of the FSW joint 82 to prevent the occurrence of anomalies or defects in the surfaces of the work pieces at the FSW joint 82.

The technical effects of the embodiments disclosed herein include the elimination of at least one defect or phenomenon known as backside coining which can occur in prior art FSW processes and which may be caused by misapplied and/or misaligned clamping pressure against the work pieces. In this regard, the FSW apparatus 10, in one embodiment, provides at least one clamping roller 30 which is specifically configured to be maintained in a substantially perpendicular relationship to the backing anvil 56 as the FSW tool 36 of the FSW apparatus 10 moves along the tool path 76 to join the work pieces together.

It should be noted that the FSW apparatus 10 and joining method 100 as described herein is not limited solely to manufacturing operations involving the friction stir welding process but can be applied to other joining systems. For example, it is contemplated that the embodiments disclosed herein with regard to maintaining the perpendicular relationship between the clamping roller 30 and the backing anvil 56 may be applied to various other joining processes including, but not limited to, riveting, punching, gluing, bending, cutting, welding, crimping and a variety of other joining operations. The FSW apparatus 10 and joining method 100 as described herein may also be employed in a variety of industries including, but not limited to, the automotive and aerospace industries.

Referring to FIG. 1, shown is a perspective view of the FSW apparatus 10 in one embodiment and which is specifically configured as a joining device for performing joining operations on work pieces wherein the tool path 76 defines a complex curvature. In this regard, a multi-axis joining machine such as a five-axis FSW apparatus 10 may be provided to facilitate movement in a variety of directions and orientations including, but not limited to, roll, pitch, yaw as well as forward/reverse and up/down motion and/or lateral motions of the FSW tool 36. However, it should be noted that a variety of configurations of FSW apparatuses 10 and other joining machines may be employed in accordance with the teachings of the present disclosure wherein the clamping roller 30 is specifically configured to maintain uniform clamping pressure between the work pieces and the backing anvil 56 as the FSW tool 36 or other joining mechanism moves along the predefined, preprogrammed or manually-driven tool path 76.

Figure 2:
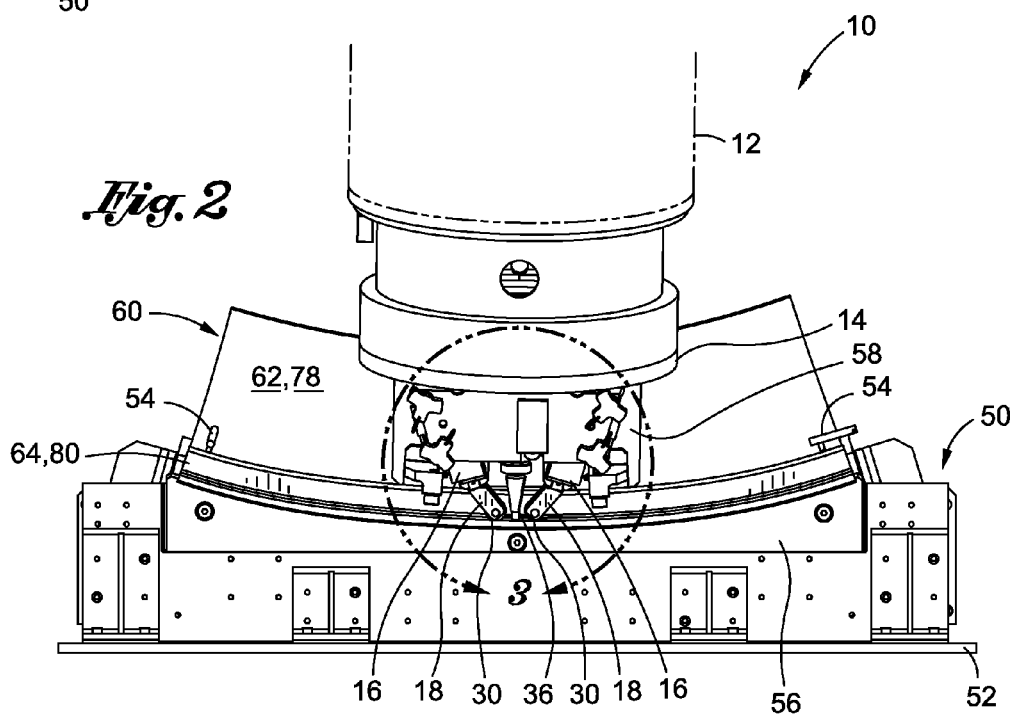
FIG. 2 is a side view of the FSW apparatus having an FSW spindle operatively connected to a FSW tool having a pair of gimbaled clamping rollers disposed on leading and trailing sides of the FSW pin.

Referring still to FIGS. 1 and 2, shown are the work pieces of a work piece assembly 60 which, in the embodiment shown, may comprise any variety of different configurations, sizes, shapes, and thicknesses. In the exemplary embodiment illustrated in FIGS. 1 and 2, the work pieces comprise the first work piece 78 which may be configured as a skin 62 element which may be joined to a second work piece 80 configured as a frame 64 element. In this regard, it should be noted that the first and second work pieces 78, 80 may be provided in any shape, size and configuration. In this regard, the frame 64 may be provided in a wide variety of shapes and sizes and is not limited solely to the Z-shaped frame configuration illustrated.

For example, it is contemplated that the frame 64 may comprise a channel-shaped cross-section or an L-shaped cross-section or any variety of different cross-sections including, but not limited to, a simple planar frame or skin element. It should also be noted that the FSW apparatus 10 and joining method 100 disclosed herein are not limited solely to the lap joint illustrated in FIGS. 1 through 4 but may be applied to butt joint applications wherein a pair of work pieces are joined in abutting arrangement (i.e., edge-to-edge) with the joint interface defining the tool path 76 along which the FSW tool 36 of the FSW apparatus 10 moves during the FSW joining method 100.

As can be seen in FIGS. 1 thru 4, the work piece assembly 60 comprised of the skin 62 and frame 64 elements is preferably configured to be supported by the fixture assembly 50 which, in one embodiment, may comprise a fixture base 52 having the backing anvil 56 disposed thereon for supporting the work piece assembly 60 at least in the clamping region 74 of the interface between the skin 62 and frame 64. Additionally, as can be seen in the figures, the fixture assembly 50 may include a positioning device 58 such as that which is shown and described in U.S. Patent Publication No. 2007/0266536 and which is entitled Tooling Head Mounted Structural Positioning Systems and Methods by Burton et al. (the Burton reference) filed on May 17, 2006, the entire contents of which is expressly incorporated by reference herein.

As disclosed in the Burton reference, the positioning device 58 may be configured to mount directly to the FSW apparatus 10 to allow travel along the tool path 76 in order to form the FSW joint 82 in the work piece assembly 60. Engagement mechanisms such as a positioning device 58 may be coupled to the FSW apparatus 10 and may be configured to exert clamping force upon the work piece assembly 60 to maintain the work pieces in constant relation to the tool path 76. Also shown in FIGS. 1 and 2 are various brackets and fittings of the fixture assembly 50 which are configured to secure the work piece assembly 60 in a non-movable position. In this regard, a plurality of hold down pins 54 or other mechanisms may be employed and installed at strategic locations in the work piece assembly 60 in order to prevent movement thereof during the FSW process.

Referring still to FIGS. 1 and 2, the FSW apparatus 10 may, in one embodiment, comprise a spindle 12 for movement in the vertical or Z-direction of the FSW tool 36. Furthermore, the FSW apparatus 10 may include a roller axis 14 which may be connected to the spindle 12 and which may have the FSW tool 36 operatively connected thereto for controlling the positioning of the FSW tool 36. In one aspect, the FSW tool 36 may comprise a retractable pin tool (RPT) wherein a pin portion 38 is retractable relative to a shoulder portion 40 in order to accommodate work pieces of varying thicknesses. In another aspect, the FSW tool 36 may comprise a fixed pin tool wherein the pin portion 38 is fixed in length or is non-movable relative to the shoulder portion 40.

Figure 3:
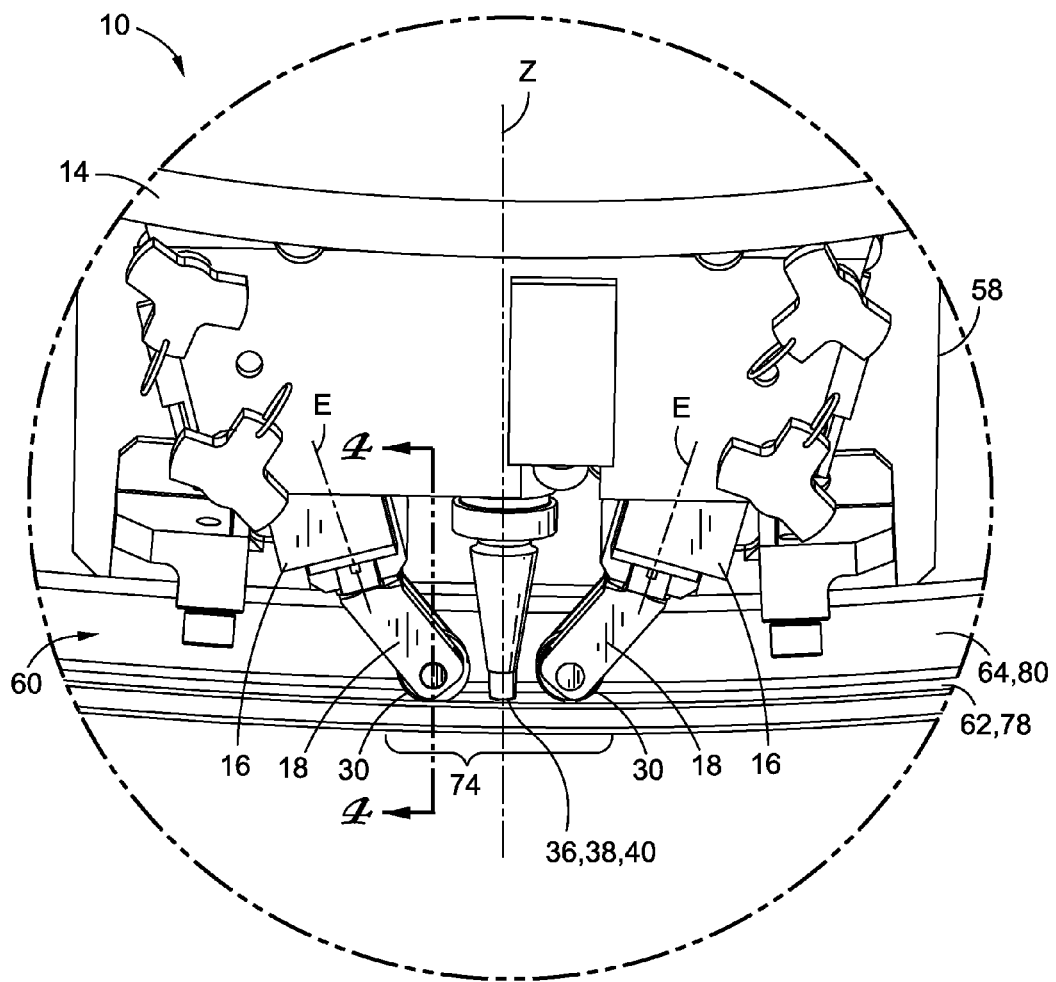
FIG. 3 is an enlarged view of the FSW apparatus of FIG. 2 and illustrating the FSW tool and the clamping rollers mounted to a corresponding pair of roller packs.

Referring briefly to FIG. 3, shown is an enlarged side view of the FSW apparatus 10 illustrating the FSW tool 36 which may comprise the pin portion 38 and the shoulder portion 40. As is well known in the art, the pin portion 38 is typically vertically plunged or driven into the work pieces to be joined and is thereafter driven along the tool path 76 such that the shoulder portion 40 of the FSW tool 36 is flush with or disposed slightly above a top side 66 surface of the work pieces. The FSW tool 36 plasticizes an annular region of the work pieces surrounding the pin portion 38 and produces a high-strength joint.

Referring back to FIGS. 1 and 2, the fixture assembly 50 may include the fixture base 52 for maintaining a desired orientation of the work piece assembly 60 relative to the FSW apparatus 10. The positioning device 58 may be operatively connected to the FSW apparatus 10 in order to exert a clamping force upon the frame 64 work piece such that the frame 64 is secured and maintained in position by the positioning device 58 in constant relation to the predefined (e.g., computer numerical control or CNC) or manually-driven tool path 76 as the FSW tool 36 is driven along the tool path 76.

With reference to the exemplary work piece assembly 60 illustrated in FIGS. 1 and 2, the skin 62 element of the work piece assembly 60 may be held in place via the set of hold down pins 54. Preferably supporting the work pieces on a side opposite the FSW tool 36 is the backing anvil 56 which may be rigidly mounted to the fixture assembly 50 and against which the clamping roller 30 may clamp the work pieces. The positioning device 58 as disclosed in the Burton reference may be provided to apply a lateral clamping force in a lateral direction against the frame 64 in order to align the frame 64 with the FSW tool 36 during movement thereof along the tool path 76.

Importantly, the embodiments disclosed herein are particularly suitable for use in multi-axis FSW operations in addition to use in facilitating movement along linear or simply-curved tool paths 76. In this regard, it should be noted that the tool path 76 may comprise a variety of different configurations including linear, curvilinear, planar and complex curvature tool paths 76 during which the clamping roller 30 applies uniform pressure to the work piece against the backing anvil 56 in order to maintain a width of the clamping roller 30 in constant contact with the topside surface of the work pieces.

Figure 4:
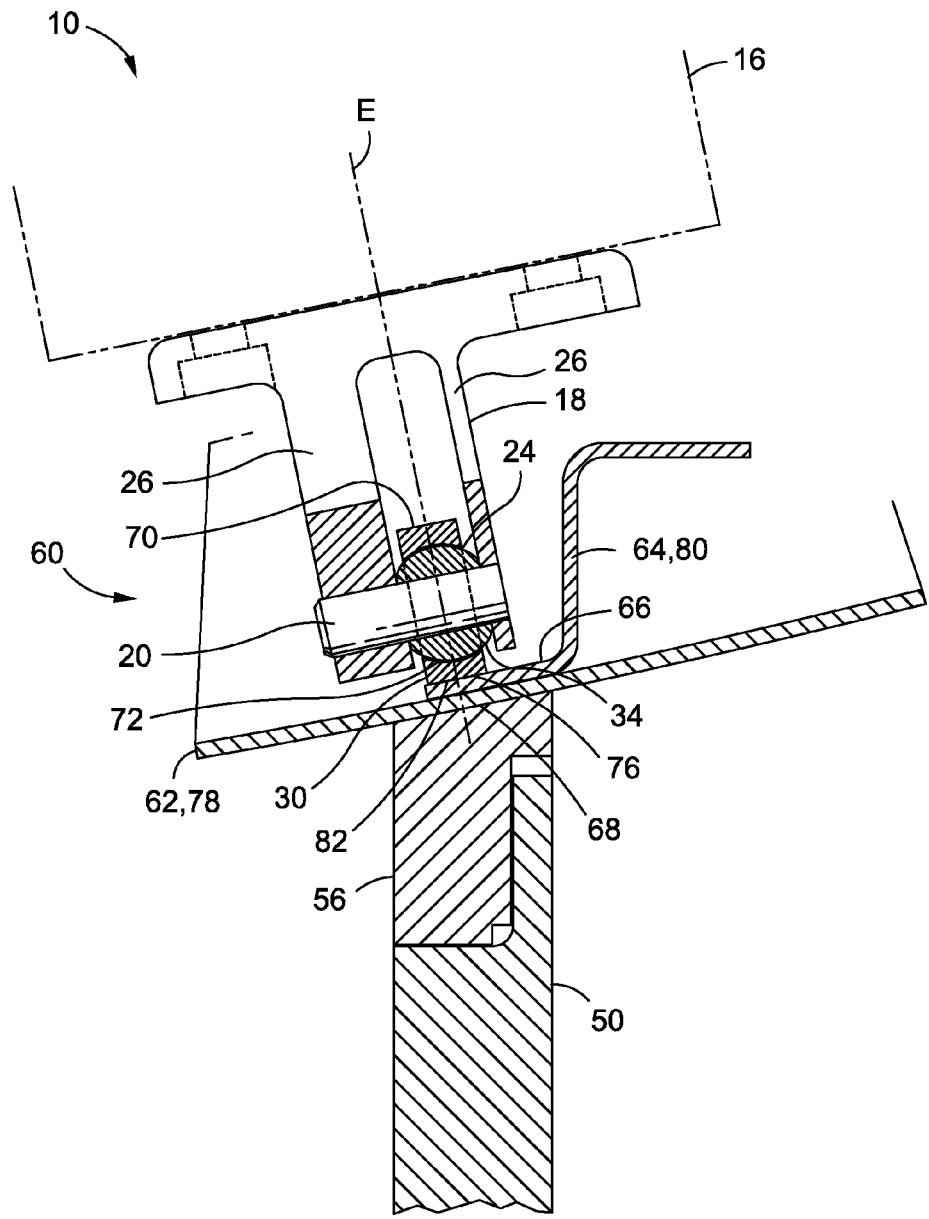
FIG. 4 is a cross sectional view of the clamping roller and roller bracket of FIG. 3 and illustrating a roller pivot joint connecting the clamping roller to the roller bracket to allow gimballing of the clamping roller.

Referring to FIGS. 1, 3 and 4, shown is the FSW apparatus 10 comprising a pair of roller brackets 18 disposed on opposing (i.e., leading and trailing) sides of the FSW tool 36 along a direction of the tool path 76. The roller brackets 18 may be configured to mount the clamping rollers 30 thereto. More specifically, in a preferred embodiment, each of the clamping rollers 30 may mount to the roller brackets 18 via a roller pivot joint 24.

As best seen in FIG. 4, the roller pivot joint 24 allows for substantially universal rotation or movement of the clamping roller 30 in order to permit alignment of the outer surface of the clamping roller 30 to the backing anvil 56. In one embodiment, the roller pivot joint 24 facilitates a perpendicular orientation of the clamping roller 30 relative to the backing anvil 56 regardless of changes in the curvature of the tool path 76 as the FSW tool 36 moves therealong. In a further embodiment, the clamping roller 30 may have a cylindrical roller outer surface 70 such that the roller pivot joint 24 maintains the cylindrical roller outer surface 70 in substantially parallel relation to the surface of the backing anvil 56.

Depending upon the geometry, the roller pivot joint 24 may be configured to maintain the cylindrical roller outer surface 70 in substantially parallel relation to the top side 66 of the work pieces such that substantially no gapping occur between the work pieces (e.g., between the frame 64 and skin 62 illustrated in FIG. 4). The perpendicular orientation of the clamping roller 30 relative to the backing anvil 56 is preferably continuously maintained at least within the clamping region 74 defined between the pair of clamping rollers 30 best seen in FIG. 3.

Referring to FIG. 4, it can be seen that the roller pivot joint 24, in one embodiment, may include a gimballing roller bearing 34 which has a clamping roller 30 mounted thereto at each of the locations on opposing sides of the FSW tool 36. The gimballing roller bearing 34 is preferably freely and universally movable in a variety of directions (e.g., 360 degrees) relative to the roller bracket. The roller bearing 34 may be disposable within a roller cavity 32 defined within the clamping roller 30. In this regard, the clamping roller 30 preferably includes a spherical cavity 32 which is sized and configured to be complementary to the spherical bearing outer surface 72.

However, it should be noted that the relative shapes and sizes of the bearing outer surface 72 and the spherical cavity 32 of the clamping roller 30 may be provided in a variety of alternative embodiments and are not solely limited to spherical shapes illustrated in the present disclosure. Furthermore, the roller pivot joint 24 is not limited to the configuration of the roller bearing 34 being rotatable on the roller pivot shaft 20 but may comprise any configuration providing free movement of the clamping roller 30 in conformance with changes in the curvature and/or direction of the tool path 76.

Figure 5:
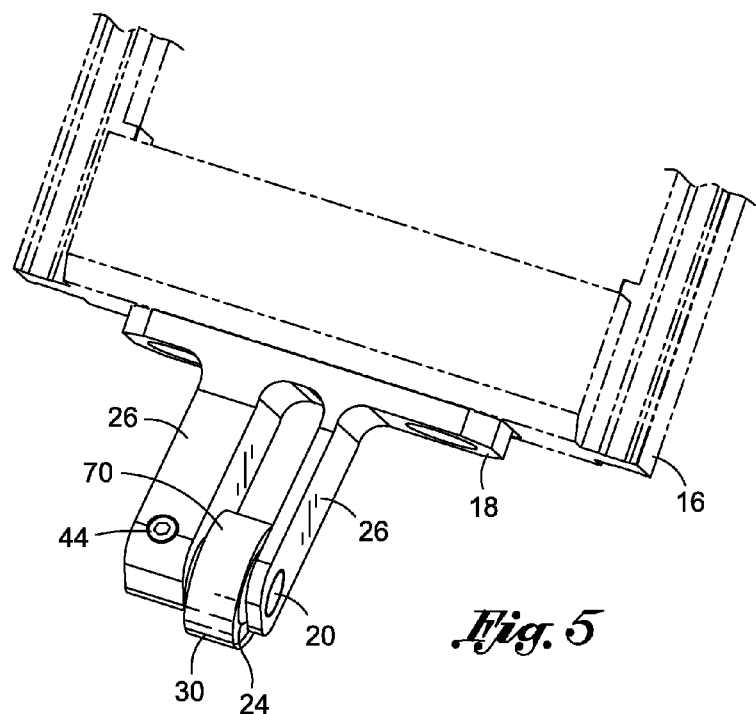
FIG. 5 is a perspective view of the roller bracket mounted to the roller pack and illustrating a roller bearing mounted on a roller pivot shaft.
Figure 6:
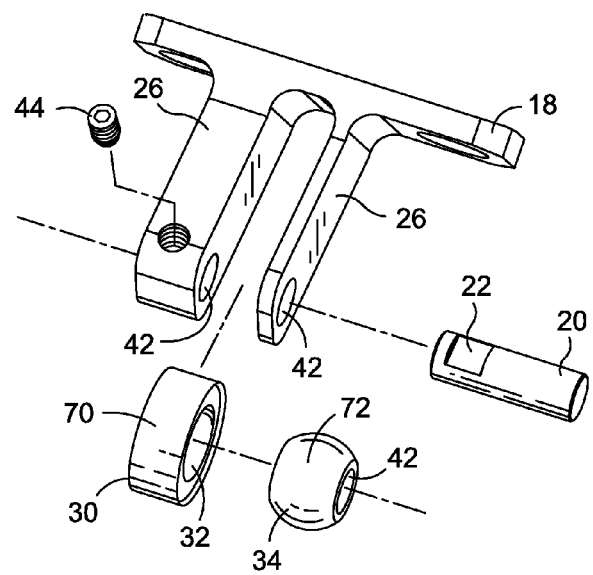
FIG. 6 is an exploded view of the roller bracket, roller bearing and clamping roller shown in FIG. 5.
Figure 7:
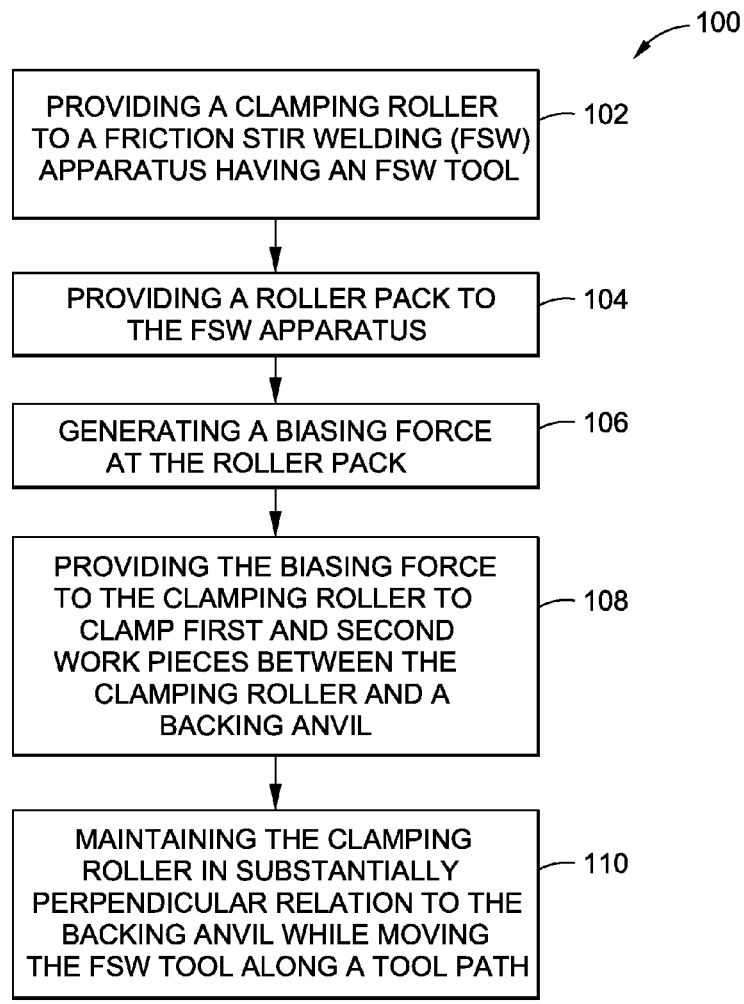
FIG. 7 is a flow diagram of a friction stir welding methodology.

The roller bearings 34 may be mounted to the corresponding roller brackets 18 such as via the roller pivot shaft 20 extending through a pair of legs 26 formed with the roller bracket 18. At least one of the legs 26 may include a mechanism for fixing the roller pivot shaft 20 such as a set screw 44 or other suitable fixing mechanism. The legs 26 allow the roller pivot shaft 20 to extend through bores 42 formed in the legs 26 as well as in the roller bearing 34 for rotation of the roller bearing 34 thereon. The roller pivot shaft 20 may be provided with a flat 22 as best seen in FIGS. 5 and 6 and which is engageable by the set screw 44 to prevent rotation of the roller pivot shaft 20. The set screw 44 is preferably threaded in order to engage a complementary threaded bore 42 formed in one of the legs 26 of the roller bracket 18. It should be noted that the roller bracket configuration shown is exemplary only and is not construed to be limiting with regard to embodiments for mounting the clamping roller. For example, the clamping roller 30 may be mounted by any suitable mechanism that facilitates substantially perpendicular relationship of the clamping roller 30 to the backing anvil 56 as the FSW tool 36 moves along the tool path 76.

Referring still to FIG. 3, the FSW apparatus 10 may further comprise a roller pack 16 on each of the sides of the FSW tool 36. Each one of the roller packs 16 may have the roller brackets 18 mounted thereto. The roller packs 16 are preferably configured to maintain a desired orientation of the roller brackets 18 relative to the FSW tool 36 and may be additionally configured to generate a biasing force at the clamping roller 30 in order to clamp the work pieces between the clamping roller 30 and the backing anvil 56.

In one embodiment, it is contemplated that the biasing force may be generated by a pair of air cylinders (i.e., one for each of the roller packs 16) and which are preferably adapted to bias the clamping rollers 30 against the top side 66 surfaces of the work pieces in order to eliminate gaps and ensure substantially abutting contact across a width of the clamping region 74 (i.e., at the interface between the work pieces). Due to the application of the biasing force generated by the air actuators and applied to the roller packs 16, each of the clamping rollers 30 is preferably configured to uniformly distribute the biasing force across the width of the outer surface of the clamping roller 30 for subsequent application to the top sides of the work pieces.

In one embodiment, the air cylinders may each be configured to generate approximately 300 pounds of downward pressure or a biasing force on the clamping roller 30 in order to clamp the work piece assembly 60 between the clamping roller 30 and the backing anvil 56. However, the roller packs 16 may be configured to apply any amount of biasing force. As was earlier mentioned, the work pieces may be arranged to be clamped between the clamping roller 30 and the backing anvil 56 in a variety of joint configurations including, but not limited to, lap joints and butt joints. Such clamping is provided continuously as the FSW tool 36 moves along the tool path 76 in the clamping region 74 due to the application of the biasing force.

Although a pair of clamping rollers 30 are shown disposed on opposing (i.e., leading and trailing) sides of the FSW pin 36, it is contemplated that a singular clamping roller 30 may be disposed adjacent the FSW tool 36 and is movable therewith during the FSW operation. Furthermore, it is contemplated that additional clamping rollers 30 may be mounted adjacent the FSW tool 36 other than the pair shown. For example, it is contemplated that two pairs of clamping rollers 30 may be provided on each of the opposing leading and trailing sides of the FSW tool 36. Clamping rollers 30 may also be positioned at other locations relative to the FSW tool 36 and are not limited to the opposing sides of the FSW tool 36 along the tool path 76.

It should also be noted that although a clamping roller 30 is illustrated as having a cylindrical roller outer surface, any surface configuration may be applied to the clamping roller 30. For example, it may be preferable to provide the roller outer surface 70 with a slightly curved cross-sectional shape or profile that is complementary to the shape or profile of the top surface of the work piece against which the clamping roller 30 bears. In this manner, the clamping pressure may be uniformly distributed against the top surface of the work pieces. Regardless of the configuration or embodiment of the clamping roller outer surface 70, it is contemplated that the clamping roller 30 is configured to be apply uniform pressure across a width of the abutting surfaces of the work pieces to maintain the work pieces in uniform contact with each other and in uniform contact against the backing anvil 56.

Furthermore, for applications wherein the fixture assembly 50 is devoid of any backing anvil 56 or the functional equivalent thereof, it is contemplated that the clamping roller 30 is maintained in substantially perpendicular relationship to a top side 66 and/or a bottom side 68 surface of the work pieces to be joined. However, it is contemplated that non-perpendicular relationships may be formed and maintained between the clamping roller 30 and the top side 66 and/or bottom side 68 surfaces of the work pieces to be joined.

Referring briefly to FIGS. 3 and 4, shown is the FSW apparatus 10 illustrating the roller pivot joint 24 having the clamping roller 30 mounted on the roller bearing 34. As can be seen, a roller axis E illustrates a preferable perpendicular relationship between the E axis and the backing anvil 56 in the clamping region 74. Also shown in FIG. 3 is the Z-axis designated as the tool axis indicating the orientation of the FSW tool 36. As can be seen in FIG. 3, the E axis of the roller packs 16 on opposing sides of the FSW tool 36 may be offset relative to one another. For example, it is contemplated that the Z-axis is oriented at a different angle relative to the top side 66 and/or bottom side 68 surfaces of the work piece and/or backing anvil 56 as compared to the orientation of the E-axis relative to the top side 66 and/or bottom side 68 surfaces of the work pieces and/or backing anvil 56.

Furthermore, it is contemplated that the Z-axis (i.e., representing the FSW tool 36 orientation) and E-axis (i.e., representing the roller pack 16 orientation) may be separately and differentially orientatable in the FSW apparatus 10 disclosed herein. In this regard, the FSW apparatus 10 provides a pressurized roller pack 16 and a gimballing roller bearing 34 that, in one embodiment, may be mountable between legs 26 of the roller bracket 18. When the pressurized roller pack 16 is energized such as via the aforementioned air actuators, the clamping roller 30 makes contact with the work pieces to be joined.

The gimballing roller bearing 34 allows the clamping roller 30 to make full surface contact with the work piece elements to be welded thereby eliminating gapping between the work pieces. In this regard, the FSW apparatus 10 advantageously prevents the problem of backside coining manifested as raised bumps or protrusions as a result of incomplete clamping between the clamping roller 30 and the backing anvil 56.

The operation of the FSW process and joining method 100 will now be described with reference to FIGS. 1 thru 8. Following installation of the first and second work pieces 78, 80 in the fixture assembly 50 and securement thereof against movement by installation of appropriate brackets such as hold down pins 54 illustrated in FIG. 1, the work pieces are preferably aligned with the backing anvil 56 along the tool path 76. Preferably, the joining method 100 may include providing a pair of clamping rollers 102 and providing a pair of roller packs 104 as illustrated in the flow diagram of FIG. 7.

In one embodiment, the clamping rollers 30 may be provided on opposing (i.e., leading and trailing) sides of the FSW tool 36. As was indicated above, the clamping rollers 30 may be mounted to the corresponding pair of roller packs 16 illustrated in FIG. 3. Following plunging of the pin portion 38 into the work pieces to be joined, the joining method 100 may further comprise the step of generating a biasing force 106 at the roller packs 16. The joining method 100 may further comprise the step 108 of applying the biasing force to the clamping rollers 30 such that the clamping roller clamps the first and second work pieces 78, 80 between the clamping roller 30 and the backing anvil 56.

Figure 8:
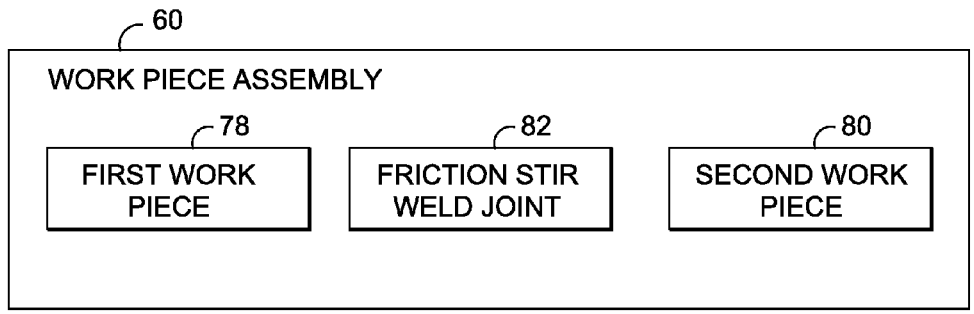
FIG. 8 is a block diagram of a work piece assembly.

As was indicated earlier, the roller packs 16 cause the clamping rollers 30 to clamp the work pieces against the backing anvil 56 as the clamping roller 30 moves with the FSW tool 36 along the tool path 76. Due to the unique configuration provided by the roller pivot joint 24 as best seen in FIG. 4, the joining method 100 may further comprise the step 110 of maintaining the clamping roller 30 in substantially perpendicular relationship to the backing anvil 56 as the FSW tool 36 moves along the tool path 76 while forming the FSW joint 82. As shown in FIG. 8, work piece assembly 60 may be produced by exemplary joining method 100 wherein the work piece assembly 60 may comprise the first and second work pieces 78, 80 joined by FSW joint 82.

If provided in a cylindrical shape, the roller outer surface 70 may be maintained in substantially parallel relation to a top side 66 of the work pieces as the FSW tool 36 moves along the tool path 76. In this regard, the roller outer surface 70 width is preferably maintained in substantially uniform contact with the top side 66 of the work pieces as the FSW tool 36 moves along the tool path 76. Biasing forces may be provided by the roller packs 16 with air actuators or other biasing mechanisms. In one embodiment, the roller packs 16 may be configured to apply a downward force in order to bias the work pieces against the backing anvil 56. In this regard, the work pieces are maintained in substantially abutting contact with one another and with the backing anvil 56 as the FSW tool 36 moves along the tool path 76 in the clamping region 74.

The above description is given by way of example, and not limitation. Given the above disclosure, one skilled in the art could devise variations that are within the scope and spirit of the embodiments disclosed herein. Further, the various features of the embodiments can be used alone, or in varying combinations with each other and are not intended to be limited to the specific combination described herein. Thus, the scope of the claims is not to be limited by the illustrated embodiments.

What is claimed is:

1. A friction stir welding (FSW) apparatus having an FSW tool for joining work pieces along a tool path, the work pieces being supportable against a backing anvil, the apparatus comprising:

at least one clamping roller having a cylindrical roller outer surface maintained in substantially perpendicular relation to the backing anvil as the FSW tool moves along the tool path;

a roller pivot joint including a gimballing roller bearing having the clamping roller mounted thereto:

a roller bracket for mounting the roller bearing thereto;

wherein:

the roller bearing has a spherically shaped bearing outer surface;

the clamping roller being rotatably mounted to the roller bracket;

the clamping roller including a cavity sized complementary to the bearing outer surface;

the roller bearing being universally movable within the roller cavity.

2. The friction stir welding apparatus of claim 1 further comprising:

a roller pack for generating a biasing force at the clamping roller;

wherein:

the clamping roller uniformly distributes the biasing force across a width of the roller outer surface for application of the biasing force to a top side of the work pieces.

3. The friction stir welding apparatus of claim 2 wherein the roller pack is air actuated.

4. The friction stir welding apparatus of claim 1 wherein the clamping roller is configured to clamp the work pieces between the clamping roller and backing anvil in at least one of the following joint configurations: lap joint, butt joint.

5. The friction stir welding apparatus of claim 1 further comprising:

a pair of the clamping rollers disposed on opposing sides of the FSW tool along a direction of the tool path, at least one of the clamping rollers having the roller bearing mounted therewithin.

6. The friction stir welding apparatus of claim 5 further comprising:

a pair of roller packs; and a pair of roller brackets, each one of the roller brackets being operatively connected to a respective one of the roller packs;

wherein:

each one of the clamping rollers being operatively connected to a respective one of the roller brackets;

the clamping rollers being maintained in substantially perpendicular relation to the backing anvil as the FSW tool moves along the tool path.

7. A friction stir welding (FSW) apparatus for joining work pieces along a tool path, the work pieces being supportable by a backing anvil and being arranged to be clamped between the clamping roller and the backing anvil in at least one of a lap joint and a butt joint, the apparatus comprising:

a spindle;

a roller axis connected to the spindle;

an FSW tool operatively connected to the roller axis and being movable along the tool path;

an air actuated pair of roller packs operatively connected to the roller axis for generating a biasing force;

a pair of roller brackets operatively connected to corresponding ones of the roller packs;

a pair of clamping rollers operatively connected to corresponding ones of the roller brackets, the clamping roller being located on opposing sides of the FSW tool along a direction of the tool path, each one of the clamping rollers having a cylindrical roller outer surface defining a width; and a pair of roller pivot joints, each one of the roller pivot joints mounting one of the clamping rollers to a corresponding one of the roller brackets, each one of the roller pivot joints maintaining the cylindrical roller outer surface width in substantially uniform contact with a top side of the work pieces as the FSW tool moves along the tool path such that the work pieces are maintained in uniform contact with each other and in uniform contact against the backing anvil, each one of the roller pivot joints including:

a gimballing roller bearing mounted to the roller bracket and having a spherically shaped bearing outer surface;

wherein:

the clamping roller includes a cavity sized to be complementary to the bearing outer surface such that the roller bearing is universally movable within the roller cavity.

* * * * *